(12) United States Patent
Zhang et al.

(10) Patent No.: US 9,292,511 B2
(45) Date of Patent: Mar. 22, 2016

(54) INFORMATION PROCESSING METHOD AND ELECTRONIC DEVICE

(71) Applicant: Lenovo (Beijing) Co., Ltd., Beijing (CN)

(72) Inventors: Xiaojun Zhang, Beijing (CN); Fenghua Yang, Beijing (CN); Darong Huang, Beijing (CN); Xuwei Wang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 192 days.

(21) Appl. No.: 14/092,384

(22) Filed: Nov. 27, 2013

(65) Prior Publication Data

US 2014/0149371 A1    May 29, 2014

(30) Foreign Application Priority Data

Nov. 27, 2012    (CN) .......................... 2012 1 0492349

(51) Int. Cl.
*G06F 17/30*    (2006.01)

(52) U.S. Cl.
CPC .... *G06F 17/30017* (2013.01); *G06F 17/30023* (2013.01)

(58) Field of Classification Search
CPC ................. G06F 17/30017; G06F 17/30023; G06T 1/0021; G06T 2201/005
See application file for complete search history.

(56) References Cited

U.S. PATENT DOCUMENTS

| | | | |
|---|---|---|---|
| 7,843,454 B1 * | 11/2010 | Biswas | 345/473 |
| 2001/0052121 A1 * | 12/2001 | Masuda et al. | 717/11 |
| 2001/0054150 A1 * | 12/2001 | Levy | 713/176 |
| 2002/0021359 A1 * | 2/2002 | Okamoto | 348/222 |
| 2008/0260294 A1 * | 10/2008 | Ogata | 382/305 |
| 2009/0033749 A1 * | 2/2009 | Motoki et al. | 348/207.99 |
| 2009/0164606 A1 * | 6/2009 | Epifania et al. | 709/219 |
| 2012/0188384 A1 * | 7/2012 | Mukai et al. | 348/207.99 |
| 2014/0247961 A1 * | 9/2014 | Kim et al. | 382/100 |

* cited by examiner

*Primary Examiner* — Jorge A Casanova
(74) *Attorney, Agent, or Firm* — Harness, Dickey & Pierce, P.L.C.

(57) ABSTRACT

An information processing method and an electronic device are disclosed in the invention. If it is determined that a multimedia file is called by an application and the application is a preset application, a parameter value is assigned to the called multimedia file; and if it is determined that the called multimedia file is called by the application which is used to browse the multimedia file, a mark corresponding to the parameter value of the multimedia file is displayed. Thereby, it is possible to known whether the multimedia file is called by observing whether there is a mark corresponding to the parameter value of the multimedia file being displayed, so as to solve the problem in the prior art that after multimedia files are called by an application, it is not possible to determine which multimedia files are called by the application when the multimedia files are browsed.

16 Claims, 5 Drawing Sheets

INFORMATION PROCESSING METHOD AND ELECTRONIC DEVICE

This application claims priority to Chinese patent application No. 201210492349.2 titled "Information processing method and electronic device" and filed with the State Intellectual Property Office on Nov. 27, 2012, which is incorporated herein by reference in its entirety.

FIELD OF THE INVENTION

The present invention relates to the technique field of data processing, in particular to an information processing method and an electronic device.

BACKGROUND OF THE INVENTION

At present, an electronic device is capable of executing an application which may call a multimedia file stored in the electronic device while being executed. For example, in the case where a user takes multiple photos by utilizing the electronic device and transmits some of the photos to a microblog, the application, i.e. the microblog, calls the photo.

In the prior art, the electronic device is capable of executing multiple applications, and each of the multiple applications may call multiple multimedia files. However, it can only be determined that the multimedia files are called by the application but it is not possible to determine which multimedia files have been called by the application when the multimedia files are browsed. Similarly, for example, after the user transmits some photos to the microblog, it is not possible to determine which photos have been transmitted to the microblog when the photos are browsed.

SUMMARY OF THE INVENTION

In view of the above, the invention provides an information processing method and an electronic device for solving the problem in the prior art that after multimedia files are called by an application, it is not possible to determine which multimedia files have been called by the application when the multimedia files are browsed.

To achieve the above object, there are now provided the following solutions:

an information processing method applied in an electronic device, wherein the electronic device is capable of running multiple applications, and the electronic device has stored one or more multimedia files, the method further includes:

determining whether a multimedia file is called by an application in a first application group, wherein the first application group includes at least one application;

if it is determined that the multimedia file is called, determining whether the application which calls the multimedia file is a preset application and obtaining a determination result;

if the determination result indicates that the application which calls the multimedia file is the preset application, assigning a parameter value to the called multimedia file;

determining whether the called multimedia file is called by a second application, wherein the second application is used to browse the multimedia file; and if it is determined that the called multimedia file is called by the second application and a preset condition is met, displaying a mark which corresponds to the parameter value of the multimedia file.

Preferably, the determining whether the multimedia file is called by an application in the first application group includes:

detecting whether a first corresponding relationship is generated, wherein the first corresponding relationship is the corresponding relationship between the attribute information of the multimedia file and the address of the application in the first application group.

Preferably, the determination of whether the preset condition is met includes:

determining whether the second application is in a preset operation mode and obtaining a determination result; and if the determination result indicates that the second application is in the preset operation mode, detecting whether a user trigger signal which is preset to correspond to the operation mode is generated.

Preferably, in a case where the first application group includes two or more applications, the assigning a parameter value to the called multimedia file includes:

assigning the parameter values which correspond to the applications to the called multimedia file.

Preferably, the displaying a mark which corresponds to the parameter value of the multimedia file includes:

acquiring an animation demonstration file; and outputting the mark which corresponds to the parameter value of the multimedia file by using a demonstration form of the animation demonstration file.

An electronic device includes:

a storage apparatus, adapted to store a multimedia file;

a main controller, adapted to determine whether the multimedia file is called by an application in a first application group, wherein the first application group includes at least one application; if it is determined that the multimedia file is called, determine whether the application which calls the multimedia file is a preset application and obtain a determination result; if the determination result indicates that the application which calls the multimedia file is the preset application, assign a parameter value to the called multimedia file; determine whether the called multimedia file is called by a second application, wherein the second application is used to browse the multimedia file; and if it is determined that the called multimedia file is called by the second application and a preset condition is met, generate and transmit a first control instruction; and a display unit, adapted to receive the first control instruction and display a mark which corresponds to the parameter value of the multimedia file.

Preferably, the way for the main controller to determine whether the multimedia file is called by the application in the first application group includes:

detecting whether a first corresponding relationship is generated, wherein the first corresponding relationship is the corresponding relationship between the attribute information of the multimedia file and the address of the application in the first application group.

Preferably, the way for the main controller to determine that the preset condition is met includes:

determining whether the second application is in a preset operation mode and obtaining a determination result; and if the determination result indicates that the second application is in the preset operation mode, detecting whether a user trigger signal which is preset to correspond to the operation mode is generated.

Preferably, in a case where the first application group includes two or more applications, the assigning a parameter value to the called multimedia file by the main controller includes:

assigning the parameter values which correspond to the applications to the called multimedia file.

Preferably, the main controller is further adapted to:

acquire an animation demonstration file; and generate a second control instruction, wherein the second control instruction is used to control the display unit to output the mark which corresponds to the parameter value of the multimedia file by using the demonstration form of the animation demonstration file.

The above technical solution shows that, in the information processing method according to the invention, if it is determined that a multimedia file is called by an application and the application is the preset application, a parameter value is assigned to the called multimedia file; and if it is determined that the called multimedia file is called by an application which is used to browse the multimedia file, a mark corresponding to the parameter value of the multimedia file is displayed. Thereby, it is possible to know whether the multimedia file is called by observing whether there is a mark corresponding to the parameter value of the multimedia file being displayed, thereby the problem in the prior art is solved, which problem is that after multimedia files is called by an application, it is not possible to determine which multimedia files are called by the application when the multimedia files are browsed.

BRIEF DESCRIPTION OF THE DRAWINGS

In order to explain the technical solutions in embodiments of the present invention or the prior art more clearly, drawings accompanying of the embodiments or the prior art are briefly illustrated hereinafter. Apparently, the accompanying drawings described hereinafter are only for some embodiments of the present invention, and those skilled in the art can further conceive other drawings according to the drawings without creative work.

DETAILED DESCRIPTION OF THE INVENTION

Hereinafter, the technical solutions in embodiments of the present invention are described clearly and completely in conjunction with the accompanying drawings of the embodiments of the present invention. It is obvious that the described embodiments are only a part of embodiments of the present invention. Other embodiments obtained by those skilled in the art on the basis of the embodiments of the present invention without creative work all fall into the scope of protection of the present invention.

An embodiment of the invention discloses an information processing method for solving the problem in the prior art that after multimedia files are called by an application, it is not possible to determine which multimedia files are called by the application when the multimedia files are browsed.

The information processing method according to the embodiment of the invention is applied in an electronic device. The electronic device is capable of executing multiple applications, and storing one or more multimedia files. The multimedia files according to the embodiment of the invention include a variety of multimedia files, such as a picture, a video and an audio.

Figure 1:
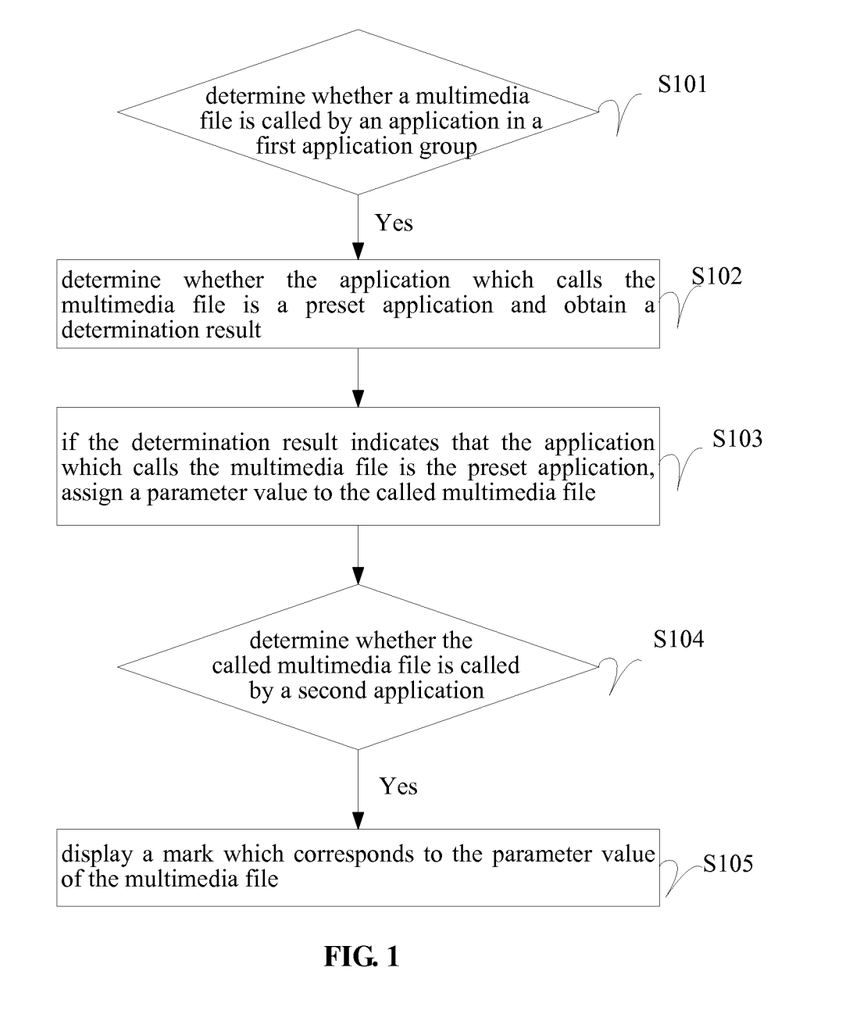
FIG. 1 is a flowchart of an information processing method according to an embodiment of the invention.

Referring to FIG. 1, the information processing method according to the embodiment includes the following steps.

S101: determining whether a multimedia file is called by an application in a first application group, wherein the first application group includes at least one application.

S102: if it is determined that the multimedia file is called, determining whether the application which calls the multimedia file is a preset application and obtaining a determination result.

In the case where the first application group includes one application and the multimedia file is called by the application, or in the case where the first application group includes multiple applications and the multimedia file is called by one of the multiple applications, it is determined whether the application which calls the multimedia file is the preset application and a determination result is obtained.

In the case where the first application group includes multiple applications and the multimedia file is called by the multiple applications, it is determined whether each of the applications which calls the multimedia file is the preset application and a determination result is obtained.

S103: if the determination result indicates that the application which calls the multimedia file is the preset application, assigning a parameter value to the called multimedia file.

In the case where there are multiple applications which call the multimedia file and it is determined that each of the applications which call the multimedia file is the preset application, the parameter values which correspond to the applications are assigned to the called multimedia file.

S104: determining whether the called multimedia file is called by a second application, wherein the second application is used to browse the multimedia file.

S105: if it is determined that the called multimedia file is called by the second application and a preset condition is met, displaying a mark corresponding to the parameter value of the multimedia file.

The preset condition may be void. In this case, the mark corresponding to the parameter value of the multimedia file is displayed as long as it is determined that the called multimedia file is called by the second application. Certainly, the condition may be set as required actually.

Moreover, in the case where there are multiple applications which call the multimedia file, the displayed marks are the parameter values corresponding to the applications which call the multimedia file.

In the embodiment, if the determination result obtained in Step S102 indicates that the application which calls the multimedia file is not the preset application, no operation will be performed and the method directly exits.

In the information processing method according to the embodiment, if it is determined that the multimedia file is called by the application and the application is the preset application, the parameter value is assigned to the called multimedia file; and if it is determined that the called multimedia file is called by the application which is used to browse the multimedia file, the mark corresponding to the parameter value of the multimedia file is displayed. Thereby, it is possible to known whether the multimedia file is called by observing whether there is the mark corresponding to the parameter value of the multimedia file being displayed, thereby the problem in the prior art is solved that after multimedia files are called by an application, it is not possible to determine which multimedia files are called by the application when the multimedia files are browsed.

Moreover, in the case where there are multiple applications which call the multimedia file, the parameter values which correspond to the applications are assigned to the called multimedia file. When the multimedia file is called by the second application, the marks corresponding to the parameter values of the multimedia file are displayed. Thereby, it may be known that the multimedia file is called by which application only by observing the displayed marks.

Figure 2:
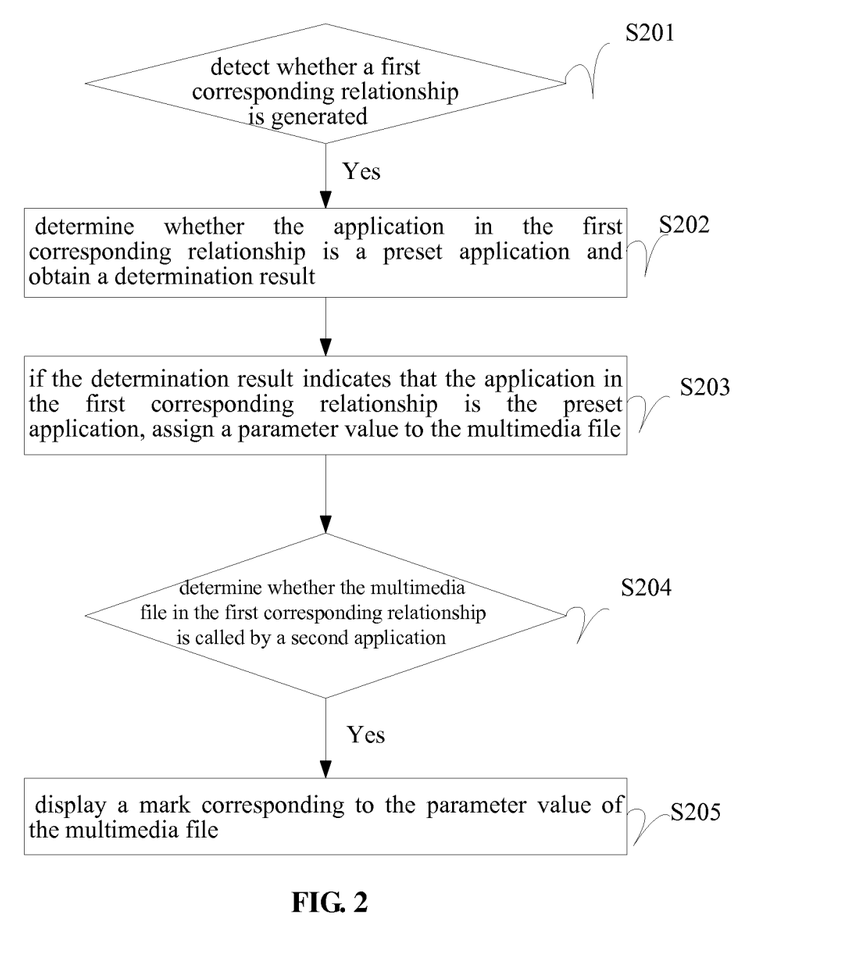
FIG. 2 is a flowchart of an information processing method according to another embodiment of the invention.

Another embodiment of the invention further discloses an information processing method. As shown in FIG. 2, the method includes the following steps.

S201: detecting whether a first corresponding relationship is generated, wherein the first corresponding relationship is the corresponding relationship between the attribute information of a multimedia file and the address of an application in a first application group, and the first application group includes at least one application.

Specifically, it may be known whether the multimedia file is called by the application by detecting whether the corresponding relationship between the multimedia file and the address of the application is generated. In the following, a specific example in which a picture is transmitted to a microblog is explained.

When the picture is transmitted to the microblog, the mapping relationship between the picture fingerprint and the microblog address is established. In the case where the picture is needed to be transmitted to Sina microblog and Tencent microblog, it is detected that whether the mapping relationship between the picture fingerprint and the Sina microblog address is established and whether the mapping relationship between the picture fingerprint and the Tencent microblog address is established.

S202: if it is detected that the first corresponding relationship is generated, determining whether the application in the first corresponding relationship is a preset application and obtaining a determination result.

If the preset application is referred to Sina microblog and Tencent microblog, it is detected whether the address of the application having the established mapping relationship with the picture is Sina microblog address or Tencent microblog address.

S203: if the determination result indicates that the application in the first corresponding relationship is the preset application, assigning a parameter value to the multimedia file in the first corresponding relationship.

In the case where there are multiple applications having the established corresponding relationships with the multimedia file, parameter values which correspond to the applications are assigned to the called multimedia file.

If it is detected that the addresses of the applications having the established mapping relationship with the picture are Sina microblog address and Tencent microblog address, a first parameter value and a second parameter value are assigned to the multimedia file, in which the first parameter value corresponds to Sina microblog and the second parameter value corresponds to Tencent microblog.

S204: determining whether the multimedia file in the first corresponding relationship is called by a second application, wherein the second application is used to browse the multimedia file.

S205: if it is determined that the multimedia file in the first corresponding relationship is called by the second application and a preset condition is met, displaying a mark corresponding to the parameter value of the multimedia file.

In the embodiment, if the preset condition is void, the marks corresponding to the first parameter value and the second parameter are displayed as long as it is determined that the picture is called by a picture browser. Thereby, it may be known that the picture is uploaded to Sina microblog and Tencent microblog only by observing the mark.

Figure 3:
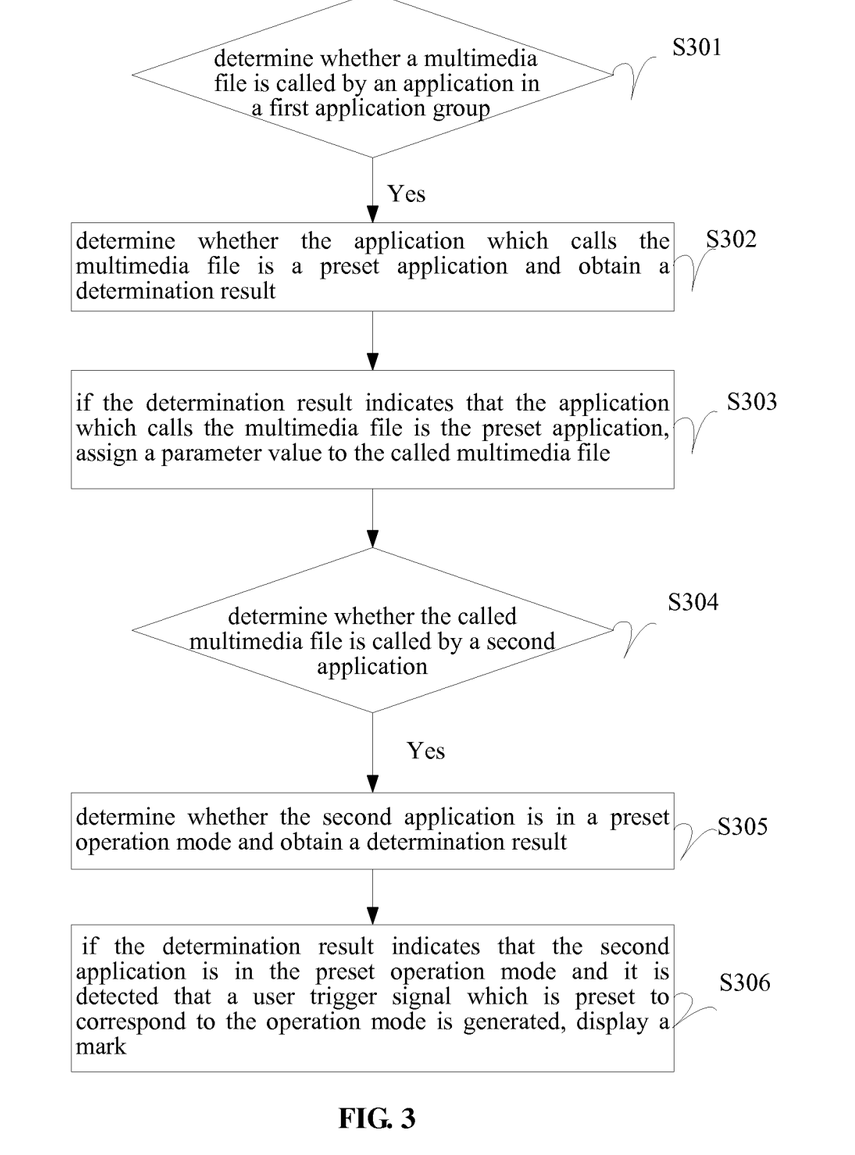
FIG. 3 is a flowchart of an information processing method according to another embodiment of the invention.

Another embodiment of the invention further discloses an information processing method. The method according to the embodiment is explained in conjunction with the example presented in the above embodiment. Referring to FIG. 3, the method includes the following steps.

S301: determining whether a multimedia file is called by an application in a first application group, wherein the first application group includes at least one application;

Whether the multimedia file is called by the application may be determined by detecting whether the corresponding relationship between the attribute information of the multimedia file and the address of the application in the first application group is generated;

S302: if it is determined that the multimedia file is called, determining whether the application which calls the multimedia file is a preset application and obtaining a determination result;

S303: if the determination result indicates that the application which calls the multimedia file is the preset application, assigning a parameter value to the called multimedia file;

S304: determining whether the called multimedia file is called by a second application, wherein the second application is used to browse the multimedia file;

S305: if it is determined that the called multimedia file is called by the second application, determining whether the second application is in a preset operation mode and obtaining a determination result.

The preset operation mode for the picture browser includes a gallery previewing operation mode and a full screen viewing operation mode.

S306: if the determination result indicates that the second application is in the preset operation mode and it is detected that a user trigger signal which is preset to correspond to the operation mode is generated, displaying a mark corresponding to the parameter value of the multimedia file.

In the case where the picture is browsed in the gallery previewing operation mode, the marks corresponding to Tencent microblog and Sina microblog are displayed when the user triggers the picture. The marks disappear immediately or after a few seconds when the user does not trigger the picture.

In the case where the picture is viewed in the full screen viewing operation mode, the marks corresponding to Tencent microblog and Sina microblog are displayed when the user triggers the picture. The marks disappear immediately or after a few seconds when the user does not trigger the picture. The marks are not displayed when the user slides and switches the picture.

In the case where the picture is viewed in the full screen viewing operation mode, the position for displaying the mark may not be changed when the size of the picture is reduced or enlarged.

In the information processing methods according to the above three embodiments of the invention, there are various ways for displaying the mark. For example, the mark corresponding to the parameter value of the multimedia file may be displayed in a fade-in way.

Specifically, an animation demonstration file is acquired; and the mark which corresponds to the parameter value of the multimedia file is output by using the demonstration form of the animation demonstration file.

Figure 4:
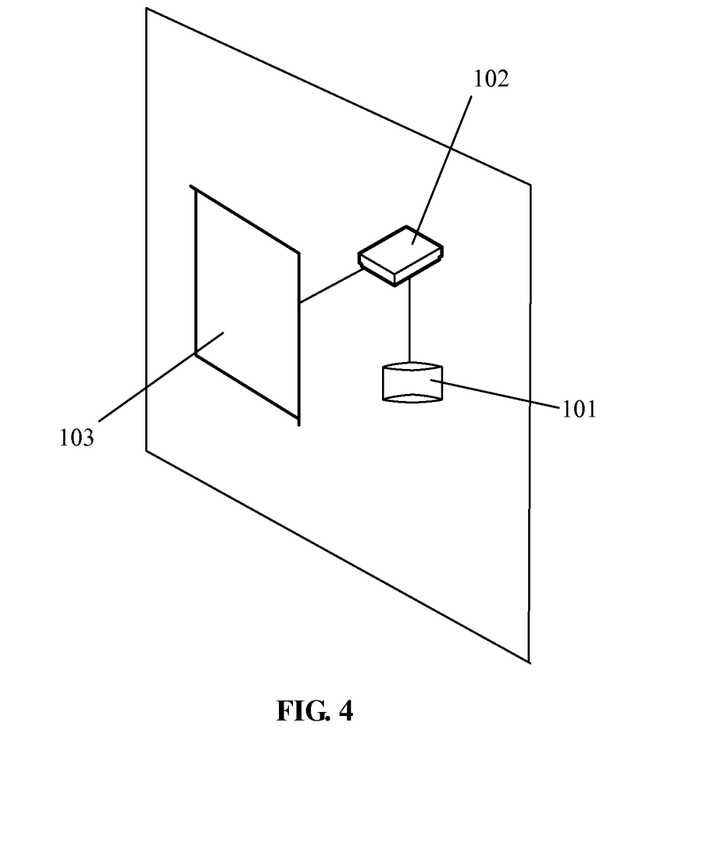
FIG. 4 is a structural diagram of an electronic device according to an embodiment of the invention.

Another embodiment of the invention further discloses an electronic device. The electronic device is capable of executing one or more applications. As shown in FIG. 4, the electronic device includes a storage apparatus 101, a main controller 102 and a display unit 103.

The storage apparatus 101 is adapted to store one or more multimedia files.

The main controller 102 is adapted to determine whether the multimedia file stored by the storage apparatus 101 is called by an application in a first application group; if it is determined that the multimedia file is called, determine whether the application which calls the multimedia file is a preset application and obtain a determination result; if the determination result indicates that the application which calls the multimedia file is the preset application, assign a parameter value to the called multimedia file; determine whether the called multimedia file is called by a second application, wherein the second application is used to browse the multimedia file; and if it is determined that the called multimedia file is called by the second application and a preset condition is met, generate and transmit a first control instruction; in which the first application group includes at least one application.

The display unit 103 is adapted to receive the first control instruction and display a mark which corresponds to the parameter value of the multimedia file.

In the electronic device according to the embodiment, if the main controller 102 determines that the multimedia file stored in the electronic device is called by the application being executed and the application is the preset application, a parameter value is assigned to the called multimedia file. Moreover, if the main controller 102 determines that the called multimedia file is called by the application which is used to browse the multimedia file, the first control instruction is generated and transmitted. The display unit 103 receives the first control instruction and displays a mark which corresponds to the parameter value of the multimedia file. Thereby, it is possible for a user to known whether the multimedia file is called by observing whether there is the mark corresponding to the parameter value of the multimedia file being displayed by the display unit 103, thereby the problem in the prior art is solved that after multimedia files are called by an application, it is not possible to determine which multimedia file are called by the application when the multimedia files are browsed.

Moreover, in the case where there are multiple applications which call the multimedia file, the main controller 102 assigns parameter values which correspond to the applications to the called multimedia file. When the multimedia file is called by the second application, the main controller 102 generates and transmits a first control instruction and controls the display unit 103 to display the mark corresponding to the parameter value of the multimedia file. Thereby, it is possible for a user to know that the multimedia file is called by which application only by observing the displayed mark.

Figure 5:
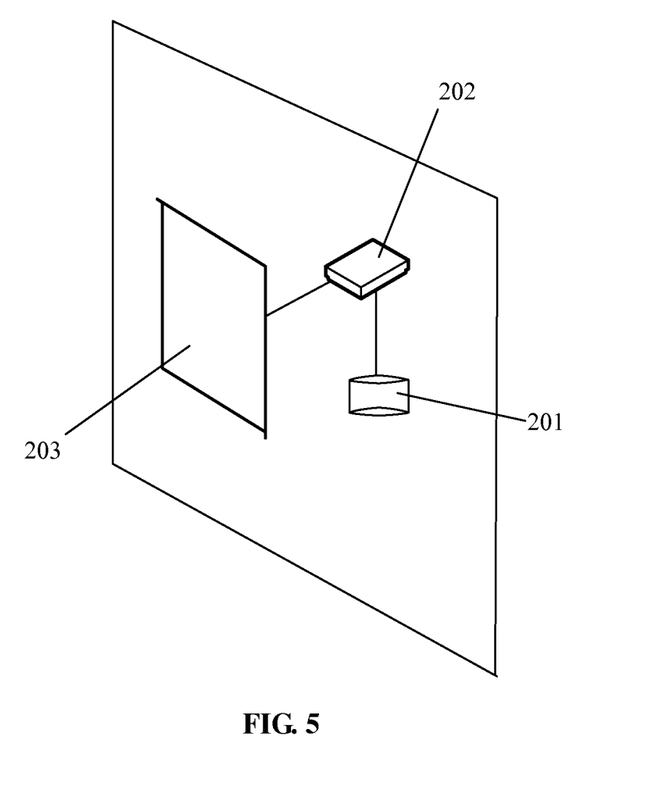
FIG. 5 is a structural diagram of an electronic device according to another embodiment of the invention.

In the embodiment, there are various ways for the main controller 102 to determine whether the multimedia file is called by the application. In the following, an embodiment is explained. Referring to FIG. 5, the electronic device according to the embodiment includes a storage apparatus 201, a main controller 202 and a display unit 203.

The storage apparatus 201 is adapted to store one or more multimedia files.

The main controller 202 is adapted to detect whether a first corresponding relationship is generated, wherein the first corresponding relationship is the corresponding relationship between the attribute information of the multimedia file and the address of the application in the first application group; if it is detected that the first corresponding relationship is generated, determine whether the application in the first corresponding relationship is a preset application and obtain a determination result; if the determination result indicates that the application in the first corresponding relationship is the preset application, assign a parameter value to the multimedia file in the first corresponding relationship; determine whether the multimedia file in the first corresponding relationship is called by a second application which is used to browse the multimedia file; if it is determined that the multimedia file in the first corresponding relationship is called by the second application and a preset condition is met, generate and transmit a first control instruction.

The display unit 203 is adapted to receive the first control instruction and display a mark which corresponds to the parameter value of the multimedia file.

Moreover, in the above two embodiments, the preset condition for determining whether the main controller is required to generate the first control instruction may be void or may further includes:

determining whether the second application is in a preset operation mode and obtaining a determination result; and if the determination result indicates that the second application is in the preset operation mode, detecting whether a user trigger signal which is preset to correspond to the operation mode is generated.

In this case, if the user triggers the electronic device in a certain preset triggering form, and the electronic device is in the preset operation mode, the main controller of the electronic device may generate and transmit a first control instruction to control the display unit 203 to display a mark which corresponds to the parameter value of the multimedia file.

Furthermore, in the case where the first application group includes two or more applications, and each of the applications in the first application group calls the multimedia file, the main controller of the electronic device assigns the parameter value to the called multimedia file.

Specifically, the parameter values which correspond to the applications are assigned to the called multimedia file; and if the main controller of the electronic device determines that the called multimedia file is called by the second application and the preset condition is met, the first control instruction is generated to control the display unit of the electronic device to display multiple marks, in which the marks corresponds to the applications.

In addition, there are various ways for the display unit of the electronic device to display the mark corresponding to the parameter value of the multimedia file. In the case where it is necessary to display the mark in an animation form, the main controller of the electronic device is further adapted to acquire an animation demonstration file; and generate a second control instruction, wherein the second control instruction is used to control the display unit of the electronic device to output the mark which corresponds to the parameter value of the multimedia file by using the demonstration form of the animation demonstration file.

Finally, it should be noted that, in the present disclosure, relational terms such as "first" and "second" are used only to distinguish one entity or operation from the other entity or operation, but not necessarily demand or imply that there is actual relation or order among those entities and operations. Furthermore, the terms "including", "containing", or any other variations thereof means a non-exclusive inclusion, so that the process, method, article or device that includes a series of elements includes not only these elements but also other elements that are not explicitly listed, or further includes elements inherent in the process, method, article or device. Moreover, when there is no further limitation, the element defined by the wording "include(s) a . . . " does not exclude the case that in the process, method, article or device including the element there are other same elements.

The embodiments of the present invention are described herein in a progressive way, with the emphasis of each of the embodiments placed on the difference between it and the other embodiments; hence, for the same or similar parts between the embodiments, one can refer to the other embodiments.

The description of the embodiments herein enables those skilled in the art to implement or use the present invention. Numerous modifications to the embodiments will be apparent to the person skilled in the art, and the general principle herein can be implemented in other embodiments without deviation from the spirit or scope of the present invention. Therefore, the present invention is not limited to the embodiments described herein, but in accordance with the widest scope consistent with the principle and novel features disclosed herein.

What is claimed is:

1. An information processing method applied to an electronic device, wherein the electronic device is configured to execute a plurality of applications and to store a multimedia file, the method comprising:
   determining whether the multimedia file is called by a first application in a first application group of the plurality of applications, wherein the first application group includes at least one application;
   in response to the multimedia file being called by the first application,
      determining whether the first application is a preset application;
      in response to the first application being the preset application, (i) assigning a parameter value to the called multimedia file; and (ii) determining whether the called multimedia file is further called by a second application and whether a preset condition is met, wherein the second application is configured to browse the called multimedia file; and
      in response to the called multimedia file being called by the second application and the preset condition being met, displaying a mark corresponding to the parameter value of the called multimedia file.

2. The method according to claim 1, wherein determining whether the called multimedia file is called by the first application comprises:
   detecting whether a first corresponding relationship is generated, wherein the first corresponding relationship is between attribute information of the multimedia file and an address of the first application.

3. The method according to claim 1, wherein determining whether the preset condition is met comprises:
   determining whether the second application is in a preset operation mode; and
   in response to the second application being in the preset operation mode, detecting whether a user trigger signal corresponding to the preset operation mode is generated.

4. The method according to claim 3, wherein displaying the mark comprises:
   acquiring an animation demonstration file; and
   outputting the mark by using a demonstration form of the animation demonstration file.

5. The method according to claim 1, wherein the first application group comprises two or more applications, and wherein assigning the parameter value to the called multimedia file comprises:
   assigning one or more parameter values to the called multimedia file, wherein the one or more parameter values each corresponds to a respective application of the first application group.

6. The method according to claim 5, wherein displaying the mark comprises:
   acquiring an animation demonstration file; and
   outputting the mark by using a demonstration form of the animation demonstration file.

7. The method according to claim 1, wherein displaying the mark comprises:
   acquiring an animation demonstration file; and
   outputting the mark by using a demonstration form of the animation demonstration file.

8. The method according to claim 2, wherein displaying the mark comprises:
   acquiring an animation demonstration file; and
   outputting the mark by using a demonstration form of the animation demonstration file.

9. An electronic device, comprising:
   a storage apparatus configured to store a multimedia file;
   a main controller configured to:
      determine whether the multimedia file is called by a first application in a first application group, wherein the first application group includes at least one application;
      in response to the multimedia file being called, determine whether the first application is a preset application;
      in response to determining that the first application is the preset application, (i) assign a parameter value to the called multimedia file; and (ii) determine whether the called multimedia file is called by a second application and whether a preset condition is met, wherein the second application is configured to browse the multimedia file;
      in response to the called multimedia file being called by the second application and the preset condition being met, generate and transmit a first control instruction; and
   a display unit configured to receive the first control instruction and display a mark corresponding to the parameter value of the called multimedia file.

10. The electronic device according to claim 9, wherein the main controller is configured to determine whether the multimedia file is called by the first application by detecting whether a first corresponding relationship is generated, wherein the first corresponding relationship is between attribute information of the called multimedia file and an address of the first application.

11. The electronic device according to claim 10, wherein the main controller is further configured to
   acquire an animation demonstration file; and
   generate a second control instruction, wherein the second control instruction is processed to control the display unit to output the mark by using a demonstration form of the animation demonstration file.

12. The electronic device according to claim 9, wherein the main controller is configured to:
   determine whether the second application is in a preset operation mode; and
   in response to the second application being in the preset operation mode, detect whether a user trigger signal corresponding to the preset operation mode is generated.

13. The electronic device according to claim 12, wherein the main controller is further configured to:
   acquire an animation demonstration file; and generate a second control instruction, wherein the second control instruction is processed to control the display unit to output the mark by using a demonstration form of the animation demonstration file.

14. The electronic device according to claim 9, wherein:

the first application group comprises two or more applications, the main controller is configured to assign one or more parameter values to the called multimedia file, and the one or more parameter values each correspond to a respective one of the two or more applications.

15. The electronic device according to claim 14, wherein the main controller is further configured to:

acquire an animation demonstration file; and generate a second control instruction, wherein the second control instruction is processed to control the display unit to output the mark by using a demonstration form of the animation demonstration file.

16. The electronic device according to claim 9, wherein the main controller is further configured to acquire an animation demonstration file; and generate a second control instruction, wherein the second control instruction is processed to control the display unit to output the mark by using a demonstration form of the animation demonstration file.

* * * * *